United States Patent
Nejezchleb et al.

(10) Patent No.: US 7,100,858 B2
(45) Date of Patent: *Sep. 5, 2006

(54) SELF-CENTERING TAPE REEL FOR SINGLE REEL TAPE CARTRIDGES

(75) Inventors: Henrik Vladimir Nejezchleb, Boulder, CO (US); Clark Milo Janssen, Loveland, CO (US)

(73) Assignee: Quantum Corporation, San Jose, CA (US)

( * ) Notice: Subject to any disclaimer, the term of this patent is extended or adjusted under 35 U.S.C. 154(b) by 208 days.

This patent is subject to a terminal disclaimer.

(21) Appl. No.: 10/481,157

(22) PCT Filed: Oct. 15, 2001

(86) PCT No.: PCT/US01/31983

§ 371 (c)(1),
(2), (4) Date: Dec. 17, 2003

(87) PCT Pub. No.: WO03/015097

PCT Pub. Date: Feb. 20, 2003

(65) Prior Publication Data

US 2004/0149850 A1 Aug. 5, 2004

(51) Int. Cl.
   G03B 23/02 (2006.01)
(52) U.S. Cl. .................... 242/343.2; 242/348; 360/132
(58) Field of Classification Search ............ 242/338.1, 242/338.2, 338.3, 343, 343.2, 348, 348.2, 242/422.4; 360/132
   See application file for complete search history.

(56) References Cited

U.S. PATENT DOCUMENTS

| 5,027,249 | A | 6/1991 | Johnson et al. |
| 5,826,811 | A | 10/1998 | Melbye et al. |
| 6,034,850 | A | 3/2000 | Del Genio et al. |
| 6,273,352 | B1 | 8/2001 | Johnson et al. |
| 2004/0007637 | A1* | 1/2004 | Nejezchleb et al. ........ 242/348 |
| 2004/0089756 | A1* | 5/2004 | Sanpei et al. ............... 242/348 |

FOREIGN PATENT DOCUMENTS

| DE | 10045032 A | 5/2001 |
| EP | 0926676 A | 6/1999 |
| EP | 1098321 A | 5/2001 |
| WO | WO 9715925 A | 5/1997 |

* cited by examiner

*Primary Examiner*—William A. Rivera
(74) *Attorney, Agent, or Firm*—Morrison & Foerster LLP

(57) ABSTRACT

The self-centering tape reel for a single reel tape cartridge provides a magnetic tape reel that is equipped with one or more features to center the tape reel with respect to a rotatably driven feature, such as a drive chuck, in the tape drive that rotates the tape reel. The self-centering tape reel uses a chamfered ring that encircles the drive teeth formed on the tape reel that engage the drive chuck. The chamfered ring fits into a chamfer that is formed in the circumference of the spline access hole located in the bottom of the tape cartridge housing.

11 Claims, 2 Drawing Sheets

SELF-CENTERING TAPE REEL FOR SINGLE REEL TAPE CARTRIDGES

FIELD OF THE INVENTION

The invention relates to single reel tape cartridges that are used in tape drive storage devices, and in particular, to a self-centering tape reel for use in a single reel tape cartridge.

PROBLEM

It is a problem in the field of single reel tape cartridges that are used in tape drive storage devices to facilitate the positioning and centering of the tape reel, located within the tape cartridge, with respect to the drive chuck of the tape drive. The tape drive chuck rotates to impart rotational motion to the tape reel by the use of features on the tape drive chuck (teeth, spline, pins, etc.) that mate with corresponding features on the hub of the tape reel. The rotation of the tape reel causes movement of the magnetic tape wound on the tape reel to or from the take-up reel that is located within the tape drive. Accurate positioning and centering of the tape reel within the tape cartridge and with respect to the tape drive chuck is desirable to ensure effective engagement between the hub of the tape reel and the tape drive chuck. Existing single reel tape cartridges fail to provide a high degree of accuracy in aligning the tape reel with the drive chuck, often resulting in the engaging features impacting each other for a period of time rather than engaging each other to rotate the tape reel.

This tape reel centering problem is exacerbated when the tape cartridge is oriented on its side (i.e. gravitational force perpendicular to the tape reel axis). Existing tape cartridges were designed to function in a flat orientation (gravity parallel to tape reel axis). When these existing tape cartridges are used in a vertical orientation, they experience failures due to the fact that they were not designed for this type of function and the tape reel is not properly located within the tape cartridge housing. Tape cartridge libraries, automatic tape cartridge loading devices, and robotic tape cartridge handling apparatus frequently orient the tape drives vertically (on their sides) and encounter failures of the tape reel drive feature to engage with the mating drive feature located on the drive chuck of the tape drive.

SOLUTION

The present self-centering tape reel for a single reel tape cartridge overcomes the problems outlined above and advances the art by providing a magnetic tape reel that is equipped with one or more features to center the tape reel with respect to a rotatably driven feature, such as a drive chuck, in the tape drive that rotates the tape reel. The self-centering tape reel for a single reel tape cartridge provides mechanical positioning and centering of the tape reel with respect to the drive chuck of the tape drive when the tape cartridge is in any orientation. This is accomplished by the use of a chamfered ring that encircles the drive teeth formed on the tape reel that engage the drive chuck. In addition, a plurality of ramped centering posts can be used in the tape cartridge housing to form a channel by which the drive teeth formed on the tape reel are guided into alignment with the drive chuck. These novel features allow for proper drive chuck feature engagement with the drive teeth even if the tape cartridge is misaligned in the tape drive.

DETAILED DESCRIPTION OF THE DRAWINGS

For purposes of illustration and not of limitation, various features and advantages of the present invention will now be described within the context of a single reel DLT tape cartridge. It is to be understood that the following description with respect to a DLT tape cartridge is not intended to limit the scope of the present invention. It would be obvious to one skilled in the art that the principles of the present Invention could be easily applied to other tape cartridge formats.

Figure 1:
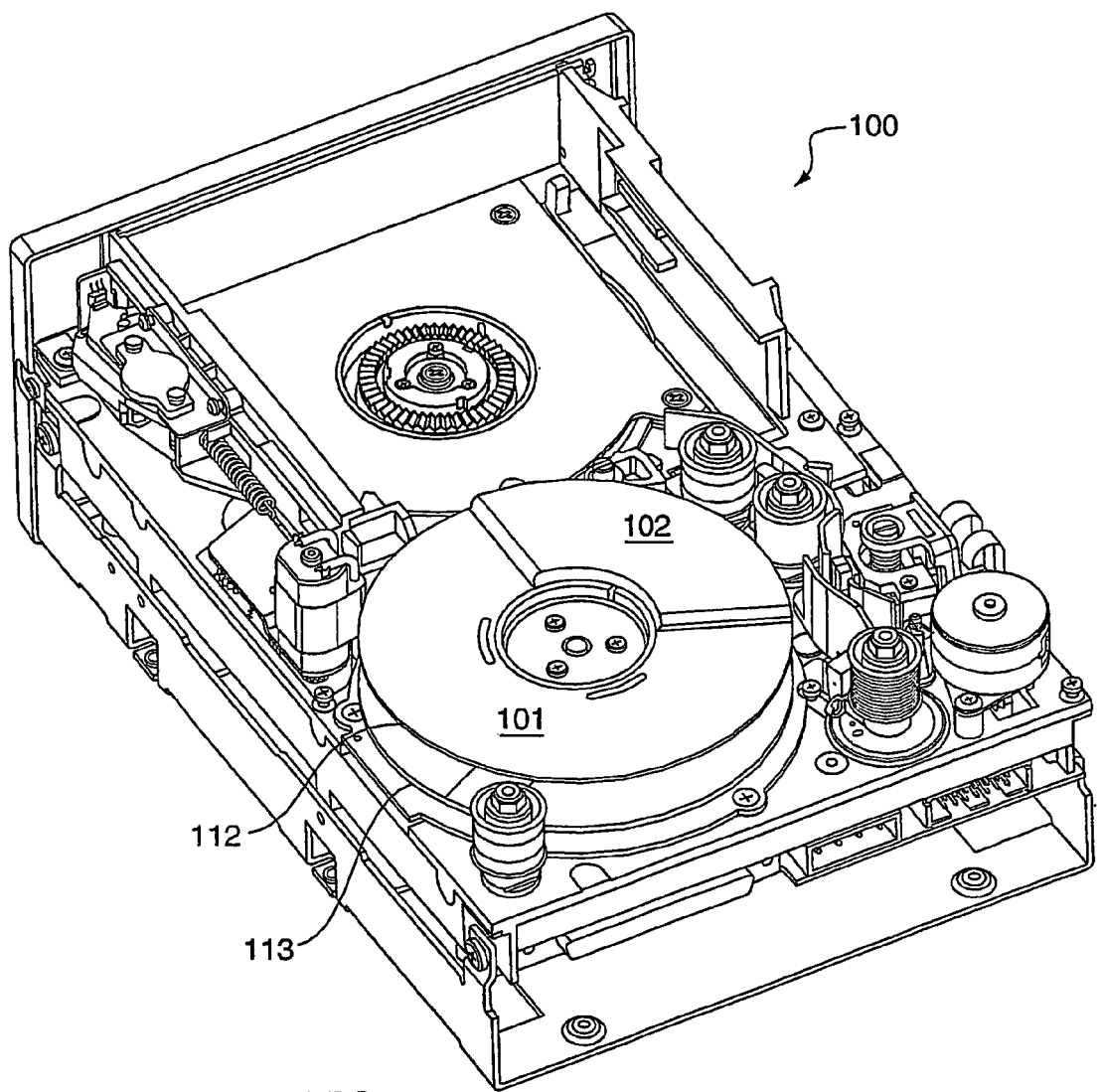
FIG. 1 illustrates a typical tape drive that is adapted to load single reel tape cartridges for the reading and writing of data on rewriteable media stored in the single reel tape cartridges.
Figure 2:
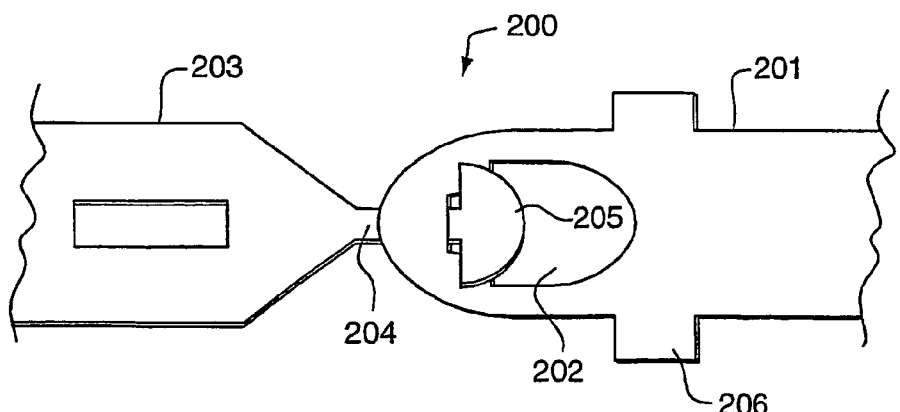
FIG. 2 illustrates a typical single reel tape cartridge and the interconnection of the rewriteable media stored therein with a leader attached to the take-up reel of the tape drive.

FIG. 1 illustrates one example of a typical tape drive 100. The tape drive 100 is a DLT tape drive that employs a single reel DLT tape cartridge. This design includes a supply reel located within a tape cartridge (not shown) and a take-up reel 101 located within the tape drive 100. Referring to FIG. 2, the magnetic tape media in the tape cartridge is terminated at one end by a tape cartridge leader 201. The tape cartridge leader 201 is a strong flexible plastic strip containing an ovular aperture 202 on is distal end. A take-up leader 203, that connects to the take-up reel 101, is a similar plastic strip that includes a stem 204 and tab 205 designed to buckle with the ovular aperture 202 on the tape cartridge leader 201 to form buckle 200. The tape cartridge leader 201 also includes a section 206 that is slightly wider than the rest of the tape cartridge leader 201 and the take-up leader 203. The wider section 206 prevents the tape cartridge leader 201 from being pulled into the tape cartridge after the tape cartridge leader 201 and take-up leader 203 are disconnected for ejection of the tape cartridge.

Upon loading the tape cartridge into the tape drive 100, the take-up leader 203 and tape cartridge leader 201 are buckled, and the tape media is wound to a start point or read position in the tape drive. To accommodate the slightly wider section 206 during winding of the tape cartridge leader 201 and the take-up leader 203 around the take-up reel 101 the take-up reel 101 includes a wider stepped area 102 formed in the top and in the bottom flanges, 112 and 113, of the take-up reel 101.

Figure 4:
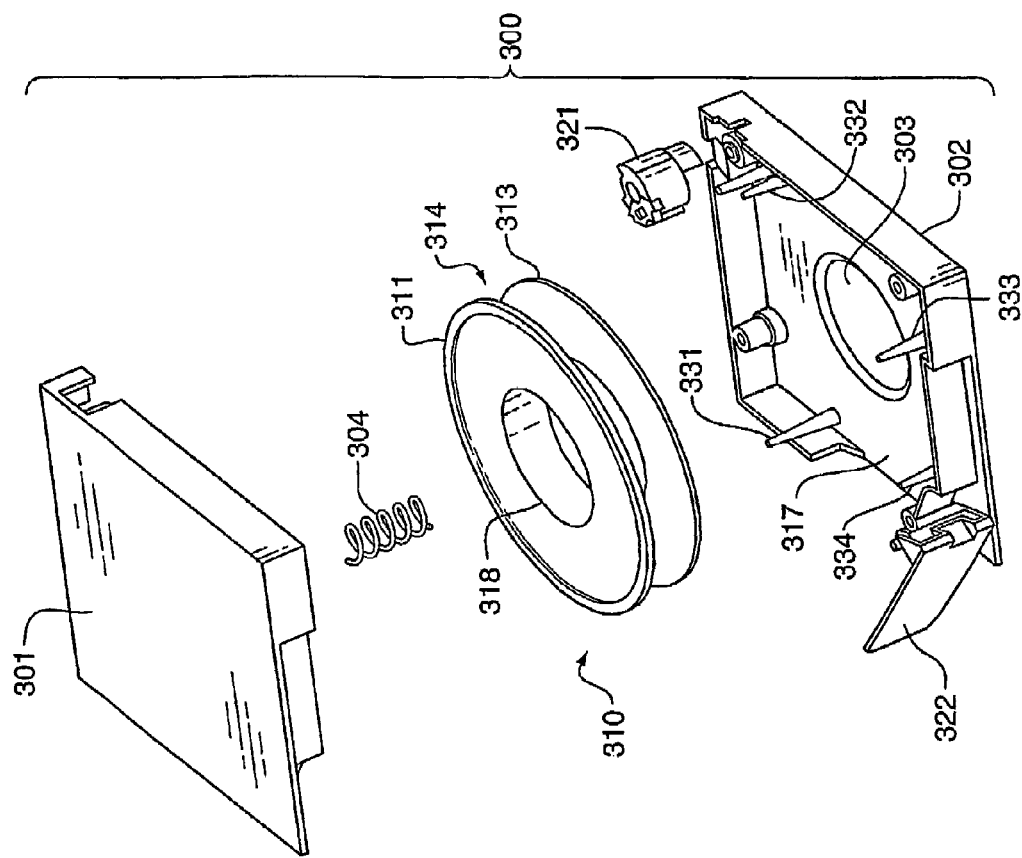
FIGS. 3 and 4 illustrate in bottom and top perspective views, respectively, an exploded representation of the self-centering tape reel for a single reel tape cartridge and a typical single reel tape cartridge in which it is housed.
Figure 3:
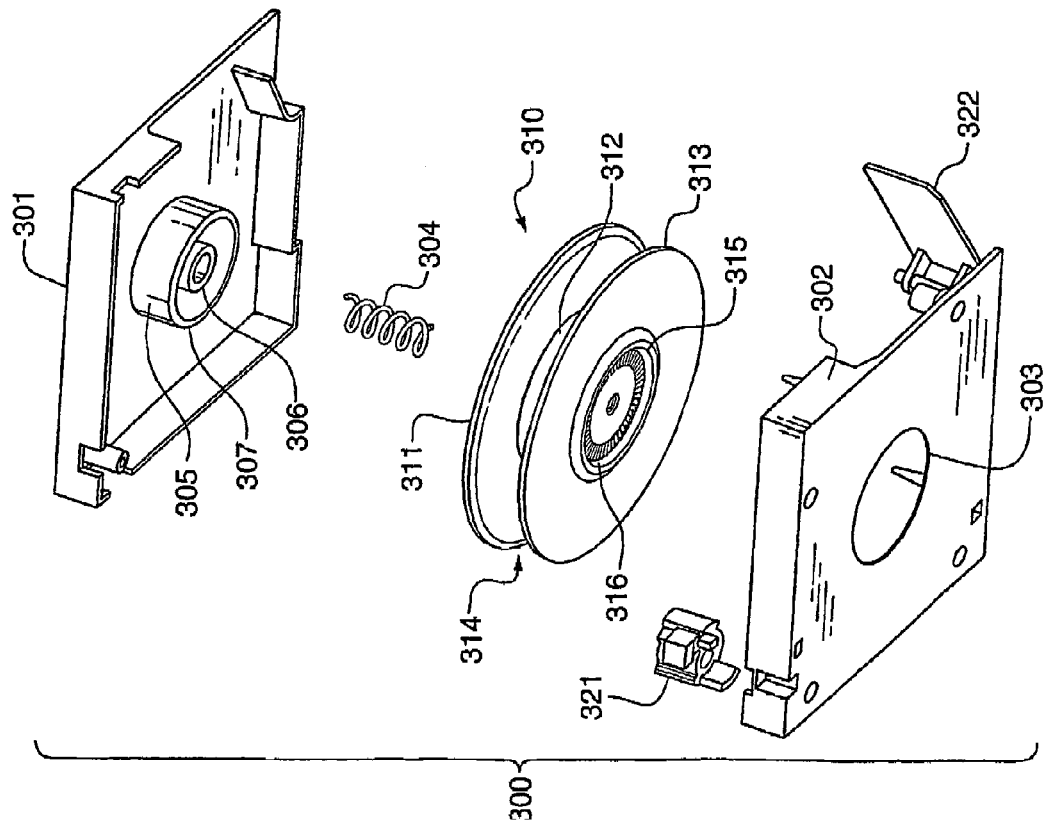

FIGS. 3 and 4 illustrate in bottom and top perspective views, respectively, an exploded representation of the self-centering tape reel 310 for a single reel tape cartridge and a typical single reel tape cartridge 300 in which it is housed. The tape cartridge 300 consists of a two-part housing that includes a top section 301 and a bottom section 302 for enclosing the tape reel 310 and its associated magnetic tape (not shown). The tape reel 310 comprises a top flange 311 connected to a top portion of a tape reel hub 312 and a bottom flange 313 connected to a bottom portion of the tape reel hub 312. The tape reel hub 312 could be a conventional tape reel hub that connects to the tape drive in a conventional manner. The top and bottom flanges, 311 and 313, are connected in a parallel relationship and form a magnetic tape media containment section 314 on the tape reel hub 312. The tape media containment section 314 guides the tape media around the tape reel hub 312 during operation of the tape drive. The tape cartridge 300 also includes a write protect element 321 and magnetic tape access door 322.

A drive chuck access hole 303 is formed in the bottom section 302 of the tape cartridge housing to enable the drive chuck (not shown) of the tape drive to engage the drive teeth 315 of the tape reel 310. A spring 304 applies a bias force to press the tape reel 310 against the drive feature (such as the drive chuck) in the tape drive when engaged to rotate the tape reel 310. One end of the spring 304 is seated in a spring sleeve 306 that is formed in the center of the interior surface of the top section 301 of the tape cartridge housing. The other end of the spring 304 engages the, tape reel 310. It is desirable to have the tape reel 310 centered with respect to the drive feature to enable the drive teeth on the drive chuck on the tape drive to accurately and securely engage the drive teeth 315 on the tape reel 310. Centering of the tape reel 310 within the tape cartridge housing and with respect to the drive chuck is achieved with by use of a tape reel hub-centering feature. This tape reel hub-centering feature consists of a chamfered centering ring 316 that encircles the drive teeth 315 formed on the tape reel 310 to engage the drive chuck. In addition, a plurality of ramped centering posts 331–334 can be used in the tape cartridge housing to form a channel by which the drive teeth 315 formed on the tape reel 310 are guided into alignment with the drive chuck.

In operation, the ramped centering posts 331–334 serve to funnel the tape reel 310 into a substantially centered position within the tape cartridge housing so that the drive teeth 315 of the tape reel 310 are centered with respect to the drive chuck access hole 303. In addition, when the tape cartridge is inserted in the tape drive, the axes of the bias spring 304, tape reel 310, and drive chuck are largely collinear. On occasion, however, the axis of the drive chuck and tape reel 310 are not collinear. This inhibits the proper engagement of the drive teeth located on the drive chuck with the drive teeth 315 on the tape reel 310. The outside diameter of the drive chuck teeth is less than the inside diameter of the chamfered centering ring 316 by a specific amount. If the inside face of the chamfered centering ring 316 comes into contact with the outside diameter of the drive chuck teeth a side wards force is applied to the tape reel 310 to automatically center it. Due to the angle and orientation of the chamfered centering ring 316, the tape reel 310 is biased to move into a position where the axes of the tape reel 310 and drive chuck are collinear. When these axes are collinear, the respective drive teeth of the drive chuck and tape reel are aligned, and have the best opportunity for full and secure engagement.

In addition, if due to some other forces, the respective drive teeth of the drive chuck and tape reel were to become disengaged, the chamfered centering ring 316 would aid in the re-engagement of the respective drive teeth of the drive chuck and tape reel since the chamfered centering ring 316 would provide a physical and mechanical barrier against the axes of the tape reel 310 and drive chuck from becoming substantially non-collinear.

ALTERNATE EMBODIMENTS

The respective and mating drive teeth of the drive chuck and tape reel could alternatively be implemented as other mating features such as, but not limited to, pin and hole configurations, matching spline tongue and groove configurations, or any other mating features that would facilitate transmitting a rotational force from a drive feature to a driven feature.

The tape cartridge 300 is also much more resistant to damage that can be caused by dropping. The tape-cartridge 300 is equipped with a cylindrically-shaped tape reel locator boss 305 that is formed in the center of the inside of the top section 301 of the tape cartridge housing. The tape reel locator boss 305 mates with the tape reel center bore 318 formed in the tape reel hub 312. In particular, the tape reel center bore 318 is a cylindrically-shaped opening of diameter greater than the diameter of the tape reel locator boss 305. The dimensions of the tape reel center bore 318 and tape reel locator boss 305 are selected to prevent lateral movement of the tape reel locator boss 305 are selected to prevent lateral movement of the tape reel 310 where the flanges 311, 313 can impact the walks of the housing. The tape reel locator boss 305 can include a chamfer 307 formed on its rim to enable smooth engagement of the tape reel locator boss 305 with the mating tape reel center bore 318. When the tape cartridge 300 is dropped, the locator boss 305 prevents the tape reel flanges 311, 313 from impacting the interior side walls of the cartridge housing 301, 302 because the locator boss 305 is located within tape reel center bore 318 which limits the travel of the tape reel side to side within the cartridge housing. In addition, a ring or ridge of raised material could be added to the inside top and/or wall of the cartridge housing which prevents the tape reel flange(s) from impacting the inside of the cartridge housing due to motion along the axis of the tape reel 310.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. A self-centering tape reel for use in a single reel tape cartridge that is configured to be loadable into a tape drive to read and write data on rewriteable media that is wound on the self-centering tape reel, the self-centering tape reel comprising: a hub; a first flange connected to a top of the hub; a second flange connected to a bottom of the hub in a parallel relationship with the first flange, wherein the first flange and the second flange define a tape containment section between said first and second flanges; and wherein said hub comprises an alignment feature disposed proximate a driving connector portion, the alignment feature shaped to translate at least a portion of a force substantially perpendicular to the second flange from a driving feature of the tape drive into a sideways force on the hub.

2. The self-centering tape reel of claim 1 wherein said driving connection portion comprises a ring of drive teeth and said alignment feature comprises: a centering ring encircling said ring of drive teeth, the centering ring having a surface facing the driving feature and sloping towards the ring of drive teeth from an outer diameter of the centering ring.

3. The self-centering tape reel of claim 1 further comprising: a spring for applying a bias force to press the hub against said driving feature.

4. A tape cartridge housing for a tape reel, the tape cartridge housing comprising:
a first section and a second section, the first and second sections adapted for assembly together and upon assembly to enclose the tape reel, and wherein at least one of the first section and the second section comprises an access port through which a drive chuck of a tape drive may access a drive chuck receiver portion of the tape reel, and at least one of the first section and the second section comprises a plurality of ramped centering posts disposed so that upon assembly, the plurality of ramped centering posts guide the tape reel for aligning the drive chuck receiver portion with the access port.

5. The tape cartridge housing of claim 4, wherein the second section comprises the access port and the plurality of ramped centering posts, and further comprising a spring disposed between the first section and the tape reel for biasing the tape reel against the second section.

6. The tape cartridge housing of claim 4, wherein the drive chuck receiver portion of the tape reel comprises a ring of teeth for engaging a drive chuck of a tape drive, and the tape reel further comprises a surface encircling and sloping towards the ring of teeth, the surface sloped to result in sideways movement of the tape reel with respect to the drive chuck in response to contact between the surface and the drive chuck.

7. A tape cartridge, comprising:
a tape reel operable to receive magnetic tape for spooling thereon, the tape reel comprising a driven feature for mating with a drive feature of a tape drive, and an alignment feature comprising a chamfered centering ring circumscribing the driven feature of the tape reel; and
a housing comprising a first section and a second section, the first section and second section for enclosing the tape reel upon assembly, and wherein one of the first section and the second section comprises an access port through which the driven feature of the tape reel is accessible, and a chamfer circumscribing the access port, the chamfer for seating the chamfered centering ring.

8. The tape cartridge of claim 7, wherein at least one of the first section and the second section comprises a plurality of ramped centering posts for guiding the tape reel to align the driven feature of the tape reel with the access port.

9. The tape cartridge housing of claim 7, further comprising a conical surface segment circumscribing and facing toward the driven feature, the conical surface segment operable to cause a sideways resultant force on the tape reel in response to a force between the conical surface segment and the drive feature.

10. The tape cartridge housing of claim 7, wherein the tape reel defines a center bore and the other of the first section and the second section comprises a tape reel locator boss, the center bore sized to receive the tape reel locator boss.

11. The tape cartridge housing of claim 10, further comprising a spring disposed between the tape reel and the other of the first section and the second section, the spring for biasing the tape reel against the one of the first section and the second section comprising the access port.

* * * * *